March 28, 1939.   R. S. WHITTINGTON   2,152,120
AUTOMATIC CONTROL OF CLUTCH AND THROTTLE ACTUATION OF AUTOMOTIVE VEHICLES
Original Filed July 15, 1932
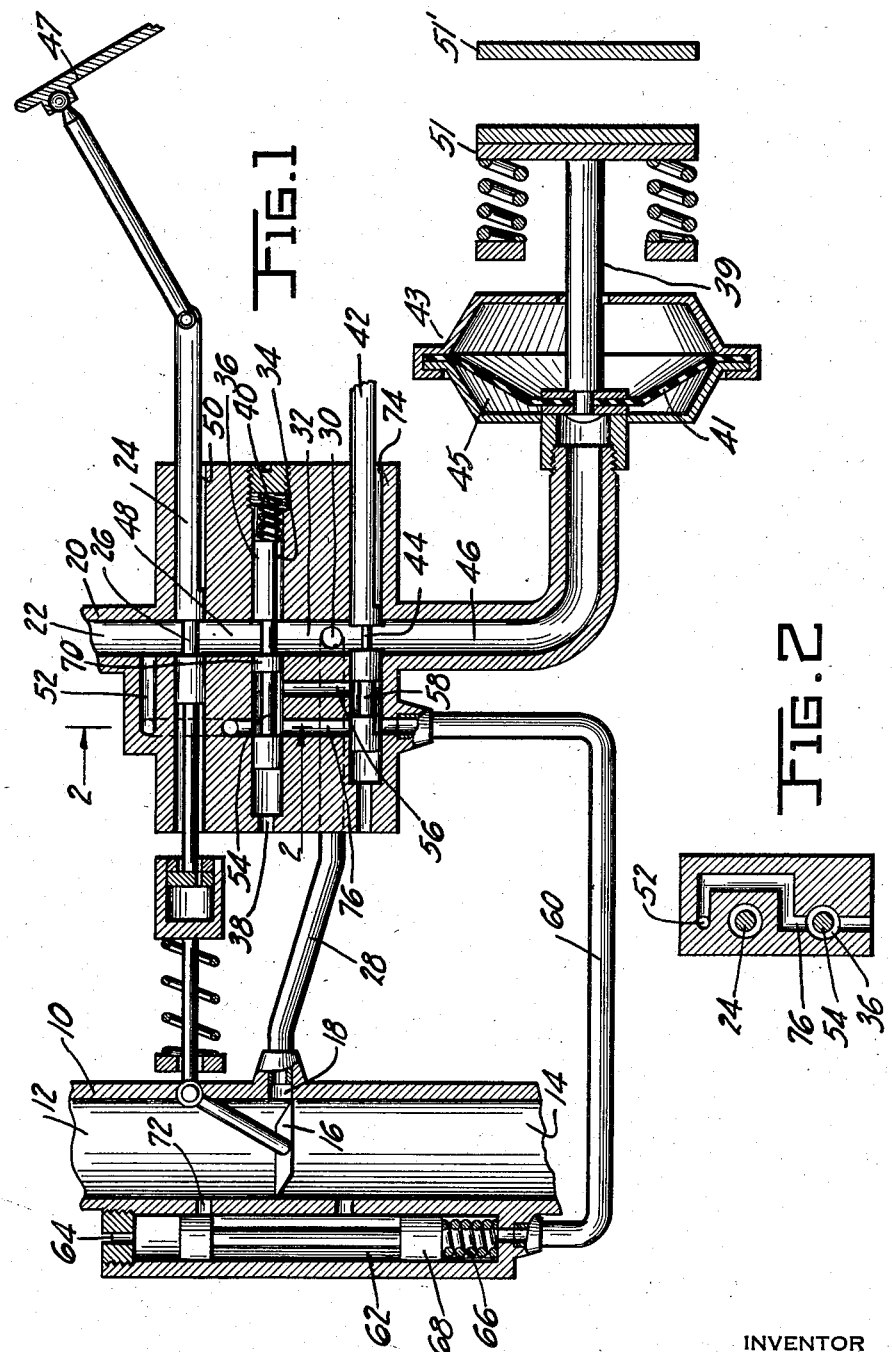
INVENTOR
RALPH S. WHITTINGTON
BY
*J. O. Clayton*
ATTORNEY Patented Mar. 28, 1939

2,152,120

UNITED STATES PATENT OFFICE 2,152,120

AUTOMATIC CONTROL OF CLUTCH AND THROTTLE ACTUATION OF AUTOMOTIVE VEHICLES

Ralph S. Whittington, Springfield, Mass., assignor to Bendix Products Corporation, South Bend, Ind., a corporation of Indiana Original application July 15, 1932, Serial No. 622,703. Divided and this application November 1, 1937, Serial No. 172,170

2 Claims. (Cl. 192—.01)

This invention relates to an automatic control means for use in controlling the actuation of throttle and clutch of an automotive vehicle in their proper relation.

One of the primary objects of this invention is to provide a control means of the above-mentioned character which will automatically control the disengagement and engagement of the clutch plates, and also control automatically the acceleration of the motor during the period that the clutch plates are contacting.

Still further, this invention contemplates the provision of a control means of the above-mentioned character which will allow the clutch plate pressure to increase or decrease accordingly as the accelerator is depressed or released during the range of clutch engagement.

This invention also provides means effecting a slower final contacting of the clutch plates at slow motor speeds than at higher motor speeds, when the accelerator is depressed rapidly.

Other objects of the invention and desirable details of construction and combinations of parts will become apparent from the following description of a preferred embodiment, which description is taken in conjunction with the accompanying drawing, in which:

Figure 1 is a semi-diagrammatic view, partly in section, of a control means constructed in accordance with this invention; and Figure 2 is a fragmentary sectional view taken substantially on the line 2—2 of Figure 1.

In general, this invention provides an automatic control means for the clutch of an automotive vehicle which also accelerates the motor automatically at the instant that the clutch begins to engage. In prior devices of this nature, this has been accomplished by means of mechanical connection to the accelerator pedal of such kind that the carburetor throttle valve would be opened the proper amount at the time the clutch started engagement. However, this has been a delicate adjustment and one that required frequent adjustment to secure the proper relation of the throttle valve setting and the beginning of clutch plate contact.

This invention also provides a method of contacting the clutch plates under full control of the accelerator pedal position, giving the operator of the vehicle better control while maneuvering the car in close quarters.

Referring then to the drawing, there is shown in Figure 1 a carburetor riser 10, which is divided into a passage 12, which is adapted to be connected to the intake manifold, and into a passage 14, which is adapted to be connected to the carburetor, by the throttle valve 16. Thus port 18 is subject to the vacuum of the intake manifold when throttle valve 16 is closed and is made subject to near atmospheric pressure in passage 14 as the throttle valve is opened.

Conduit 20 is adapted to be connected to the intake manifold, subjecting passage 22 to the vacuum in the intake manifold. Piston 24 is controlled by the accelerator pedal, and its position in Figure 1 corresponds to complete release of the accelerator. Vacuum acts by piston 24 by virtue of reduced portion 26 of piston 24. As the motor idles, vacuum also acts through port 18 and conduit 28, through port 30 to passage 32, and through groove 34 of valve 36. This allows atmospheric pressure acting through hole 38 to overcome spring 40 and move valve 36 to the position shown in Figure 1. Vacuum can then act from passage 22 by valve 36 and past valve 42, by virtue of reduced portion 44 of valve 42, to passage 46. The direct opening thus provided from passage 22 to passage 46 effects an evacuation of a compartment 45 of a pressure differential operated motor 43. The diaphragm or power element 41 of the motor is connected to the driving clutch plate 51 by a connecting rod 39. When the compartment 45 is evacuated, the motor is energized to effect a disengagement of the clutch.

When the accelerator pedal 47 is depressed, piston 24 is moved to close off vacuum from passage 22 and introduce atmosphere into passage 48 through groove 50 of piston 24. Thus atmosphere moves directly to passage 46 to effect a deenergization of the motor 43 and permit the clutch to move toward engagement. When the driving clutch plate 51 contacts the driven plate 51', valve 36 closes passage 48 from passage 32 due to the drop in vacuum in passage 32 at the initial contacting of the clutch plates.

Vacuum in passage 22 acts through passage 52, past reduced portion 54 of valve 36, through passage 56, past reduced portion 58 of valve 42, through conduit 60 to bore 62. Atmospheric pressure acting through hole 64 overcomes spring 66 and holds piston 68 in the position shown in Figure 1.

However, as soon as valve 36 moves to close passage 48 from passage 32, the enlarged portion 70 of valve 36 cuts off passage 56 from vacuum in passage 22 and subjects passage 56 to the decreasing vacuum in passage 32. This drop in vacuum is transferred through conduit 60 to piston 68. Spring 66 is of such strength that piston 68 is moved to uncover port 72, when the vacuum in passage 32 drops to some predetermined value, which can correspond to any clutch plate pressure.

Also, if passage 56 is moved nearer to passage 32, it will be in communication with passage 32 through groove 34 of valve 36 before valve 36 closes passage 46 from passage 32. Thus valve 68 can be made to respond to atmospheric pressure in varying degrees according to the location of passage 56, resulting in earlier acceleration of the motor with reference to the contacting of the clutch, as passage 56 is moved toward passage 32.

Control valve 42 is to be operated by the driver of the vehicle to render the whole automatic system inoperative at will. When control valve 42 is moved inward, vacuum from passage 22 is shut off from passage 46 at all times, and passage 46 is placed in communication with the atmosphere through groove 74, rendering the clutch operating diaphragm inoperative. Also, passage 56 is closed by control valve 42 and passage 76 is opened. Thus, passage 32 is always closed from conduit 60 and passage 22 is always open to conduit 60, so that full manifold vacuum always acts on piston 68 to make the automatic accelerating feature inoperative while starting the vehicle. Also, conduit 28 is tapped into passage 32 at port 30 above control valve 42, so that valve 42 will entirely shut off vacuum from the clutch actuating diaphragm.

The invention heretofore described is disclosed in my Patent No. 2,103,284, granted December 28, 1937, this application constituting a division thereof.

While one illustrative embodiment has been described, it is not my intention to limit the scope of the invention to that particular embodiment, or otherwise than by the terms of the appended claims.

I claim:

1. In an automatic control means for the clutch of an automotive vehicle, the combination with the intake system, the carburetor riser and throttle valve, and a mechanism for controlling the throttle valve, of a pressure responsive means for releasing the clutch, means providing a passage between said intake system and said pressure responsive means, a main valve in said passage operable to control communication between said passage and said intake system, and between said passage and the atmosphere, an auxiliary valve in said passage for closing the passage between atmosphere and said pressure responsive means, means operating when the motor is idling to actuate said main valve and said auxiliary valve to provide direct communication between said intake system and said pressure responsive means to release said clutch, means operating upon the actuation of said throttle valve control mechanism to actuate said main valve to close said passage from the intake system and open said passage to the atmosphere whereby said clutch is moved toward engaged position, means operative by conditions accompanying the partial engagement of said clutch to close said auxiliary valve, and a conduit connecting said passage between said auxiliary valve and said pressure responsive mens to said carburetor rising through a port being exposed to vacuum in said intake system when said throttle valve is closed and exposed to pressure in the carburetor riser on the opposite side of said throttle valve as said throttle valve is opened, a third valve in said passage, said third valve being located between said pressure responsive means and a point where said conduit connects to said passage, said third valve being operable to control communication between said passage and said pressure responsive means, and between atmosphere and said pressure responsive means.

2. In an automatic control means for the clutch of an automotive vehicle, the combination with the intake system and a mechanism for controlling the acceleration of the motor, of a pressure responsive means for releasing the clutch, means providing a passage between said intake system and said pressure responsive means, a main valve in said passage operable to control communication between said passage and said intake system and between said passage and the atmosphere, an auxiliary valve in said passage between said valve and said pressure responsive means for closing said passage, means operating when the motor is idling to open said main valve to admit vacuum from said intake system to said passage, a by-pass of said auxiliary valve from said intake system to said passage, said by-pass being controlled by said valve to be open only when said valve opens said passage, means allowing pressure in said passage beyond said auxiliary valve to actuate said auxiliary valve, a spring actuating said auxiliary valve in opposition to atmospheric pressure, means allowing atmospheric pressure to actuate said auxiliary valve in opposition to said spring, said spring being operable to close said auxiliary valve after said valve has admitted sufficient atmosphere by said auxiliary valve to allow said clutch to partially engage and reduce the vacuum in said passage.

RALPH S. WHITTINGTON.